(12) United States Patent
Nishide et al.

(10) Patent No.: US 7,206,463 B2
(45) Date of Patent: Apr. 17, 2007

(54) IMAGE PROCESSING METHOD, DEVICE AND SYSTEM

(75) Inventors: Yasushi Nishide, Ebina (JP); Ryuichi Ishizuka, Ebina (JP); Mari Kodama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 789 days.

(21) Appl. No.: 10/409,158

(22) Filed: Apr. 9, 2003

(65) Prior Publication Data

US 2004/0081371 A1 Apr. 29, 2004

(30) Foreign Application Priority Data

Oct. 28, 2002 (JP) ............................. 2002-313289

(51) Int. Cl.
*G06K 9/32* (2006.01)
*H04N 1/46* (2006.01)
*G09G 5/00* (2006.01)
*G06K 9/00* (2006.01)
*G06K 9/36* (2006.01)

(52) U.S. Cl. ...................... 382/298; 382/282; 358/538; 345/620; 345/629

(58) Field of Classification Search ................ 382/298, 382/294, 282, 283, 257, 162, 167, 190, 203; 358/1.1, 1.2, 1.4, 1.9, 1.15, 530, 531, 537, 358/540, 538; 345/619, 620, 629, 660, 662, 345/666, 472
See application file for complete search history.

(56) References Cited

U.S. PATENT DOCUMENTS 5,542,052 A * 7/1996 Deutsch et al. ............. 345/589
5,668,931 A * 9/1997 Dermer ....................... 358/1.4
6,509,903 B1 * 1/2003 Yosefi ......................... 345/597

FOREIGN PATENT DOCUMENTS

JP   A 2000-106628   4/2000

* cited by examiner

*Primary Examiner*—Yon J. Couso

(74) *Attorney, Agent, or Firm*—Oliff & Berridge, PLC

(57) ABSTRACT

An image processing device method and system that enables overprint reproduction even for a composite output, despite its simple configuration.

In a print server, when a construction command of a path is detected, if a trap width is set, object information is extracted from a drawing command and saved, and when the path is constructed, information which can specify the constructed path is extracted and saved with the object information. Moreover, when a drawing process is executed, a trapping process is executed on the path using saved object information. As a result, a corresponding object can be drawn by overprinting.

19 Claims, 5 Drawing Sheets

IMAGE PROCESSING METHOD, DEVICE AND SYSTEM

BACKGROUND OF THE INVENTION

1. Field of the Invention

The present invention relates to an image processing method, device and system for allowing image data, such as a page layout created on an image processing terminal using an application, to be subject to image processing such that the image data can be outputted with a printer.

2. Description of the Related Art

Desktop Publishing (DTP) has increased in use and popularity with the progress of digitalization in the field of print processing. DTP system can create, process and edit an image on an image processing terminal, such as a personal computer or a workstation, using various applications to create a page layout. In a color electronic plate-making system (CEPS), a printing device creates film for exposing a printing plate based on the page layout, and directly writes on the printing plate so as to create a press plate for printing (CTP: Computer to Plate).

When proofing is performed prior to printing or the like using an actual press plate, the page layout is displayed on a monitor, and then printed out using a WYSIWYG function or the like with a print output device such as a laser printer or a page printer.

In the printing process using the press plate, when colors are overlapped and plate misalignment occurs, color drift of an image or gaps between colors appear on the printed material. Particularly when overlapping a foreground color on a knockout (unprinted area) in the shape of the foreground object, formed on a background, plate misalignment causes white gaps to appear on the edges of the knockout shape. In order to prevent this, a trapping process is executed.

The trapping process includes spreading the foreground object and choking the knockout shape. In the spread process, for example, when a circular object is overlapped on a square object, the inside of the square object is knocked out in the shape of the circular object, and the circular object is drawn so as to be larger than the original circular object. In the choke process, the inside of the square object is knocked out in the shape of the circular object such that the knocked out shape is smaller than the circular object, and the circular object is drawn in the original size.

As a result, in both the spreading and choking, trapping in which the periphery edge portion of the circular object is overprinted on the square object is realized.

In order to achieve overprinting using a color printer, separated output for data of individual colors such as cyan (C) magenta (M). yellow (Y) and black (B) is required, as is the case when creating a press plate. For this reason, respective separation plates must be synthesized and output by using an image processing device having a synthesizing function. However, synthesizing image data separated and outputted on the application side requires hardware having large memory capacity and high processing ability. Moreover, separation output requires longer processing time than composite output, wherein image data is outputted without separating color into C, M, Y and K.

A technique has been proposed in which the trapping process is carried out on a bit map image read by a layout scanner or the like (for example, see Japanese Patent Application Laid-Open (JP-A) No. 2000-106628).

However, implementation of this technique has several drawbacks in that expensive hardware is required, and it is difficult to reproduce setting of trap width, choke and spread for each object set by an application.

Namely, in the composite output, the application outputs only a drawing code for executing a process (e.g., "drawing a square and a circle"), and this code does not include a drawing code in which the trapping is taken into consideration. For this reason, in order to reproduce the trapping by means of the composite output, it is necessary to knockout the object in which the trapping is set and to perform trapping before that object is drawn.

In a standard drawing command, a "path" for describing a shape composed of a series of connected points, lines, and curved lines, and non-connected points, lines, and curved lines, is constructed, after which actual drawing is executed. At this time, there is no guarantee that the constructed path will definitely be drawn, and thus the path might be used for a clip (drawing area specification) or occasionally discarded. Therefore, when knocking out is executed at the time of constructing the path, if the purpose or use of the path is unknown, the possibility exists that a different or undesirable drawing result will be obtained.

For this reason, knocking out must be executed not at the time of path construction but rather at the actual drawing stage. However, it is difficult to obtain information, such as accurate coordinates, from the constructed path. Moreover, it is not easy to determine what object is being drawn. As a result, it is difficult to execute trapping processes such as knocking out the background into a slightly smaller shape than the foreground object, or to draw the foreground shape as slightly larger. In other words, it is difficult to reproduce trapping from the composite output. Accordingly, the conventional art produces results that are far from satisfactory and is thus in need of improvement.

SUMMARY OF THE INVENTION

The present invention was devised in order to solve the above problems, and its object is to provide an image processing method, device and system which are capable of reproducing trapping on a composite output without relying on hardware having large memory capacity and high processing ability.

In order to achieve the above-stated objective, the present invention provides an image processing method of executing image processing corresponding to a drawing command or image data based on a page layout created by an image processing terminal, so as to enable a printing output corresponding to the page layout, the invention comprising: saving information, including a position and a shape of the object, in a saving means, when setting an object placed on the page layout; and when drawing the object on the page layout, enlarging or shrinking the object with an enlarging/shrinking means based on the information saved in the saving means.

For example, when the path of the object is constructed based on a drawing command or image data, the object information is saved. Moreover, when the object where the path is constructed is enabled to be drawn, the enlarging/shrinking process is given relatively between the object and a background based on the information saved in the saving means.

As a result, the object in which the trapping is specified is enabled to be drawn on the background by trapping.

Another embodiment of the present invention provides an image processing device comprising: an input section for inputting image information including image data of an image including an object, information about a position and a shape of the object in the image, and trapping process setting information for the object.

The image processing devices comprises a processing section for constructing a path forming the object based on the position and shape information of the object in the inputted image information and when drawing the constructed path, executing the trapping process on a shape, which is based on the path, on the basis of the position and shape information of the object and the trapping process setting information in the inputted image information.

Another embodiment of the present invention provides an image processing method comprising the steps of: inputting image information including image data of an image including an object, position and shape information of the object in the image and trapping process setting information for the object; constructing a path forming the object based on the position and shape information of the object in the inputted image information; and when drawing the constructed path, executing the trapping process on the shape, which is based on the path, on the basis of the position and shape information of the object and the trapping process setting information in the inputted image information.

Yet another embodiment of the present invention provides an image processing system comprising an image processing terminal; and an image processing device, wherein the image processing terminal creates image information, which includes image data of an image including an object, and drawing commands including information about a position and a shape of the object and trapping process setting information for the object The image processing device comprises: an input section for inputting the image information from the image processing terminal; and a processing section for constructing a path forming the object based on the position and the shape of the object in the inputted image information and when drawing the constructed path, executing the trapping process on the shape, which is based on the path, on the basis of the position and shape information of the object and the trapping process setting information in the inputted image information.

In the invention, when the shape of the object to be arranged on the page layout, such as the path construction, is set, the information can be stored in a smaller storage area without requiring special processing. This is due to the fact that the information, which enables the shape, position and the like of the object to be specified, is extracted and saved, thereby enabling quick processing.

In the invention, it is preferable that only the information about the object in which trapping is specified is saved in the saving means.

Additionally, in the present invention, the trap width set in a drawing command or the image data is saved as the object information into the saving means. Meanwhile, the enlarging/shrinking means sets the enlargement/shrinkage width of the object based on the trap width saved in the saving means.

As a result, even with composite outputs, the object can be trapped with a suitable trap width corresponding to the drawing command and the image data.

DETAILED DESCRIPTION OF THE EMBODIMENTS

Figure 1:
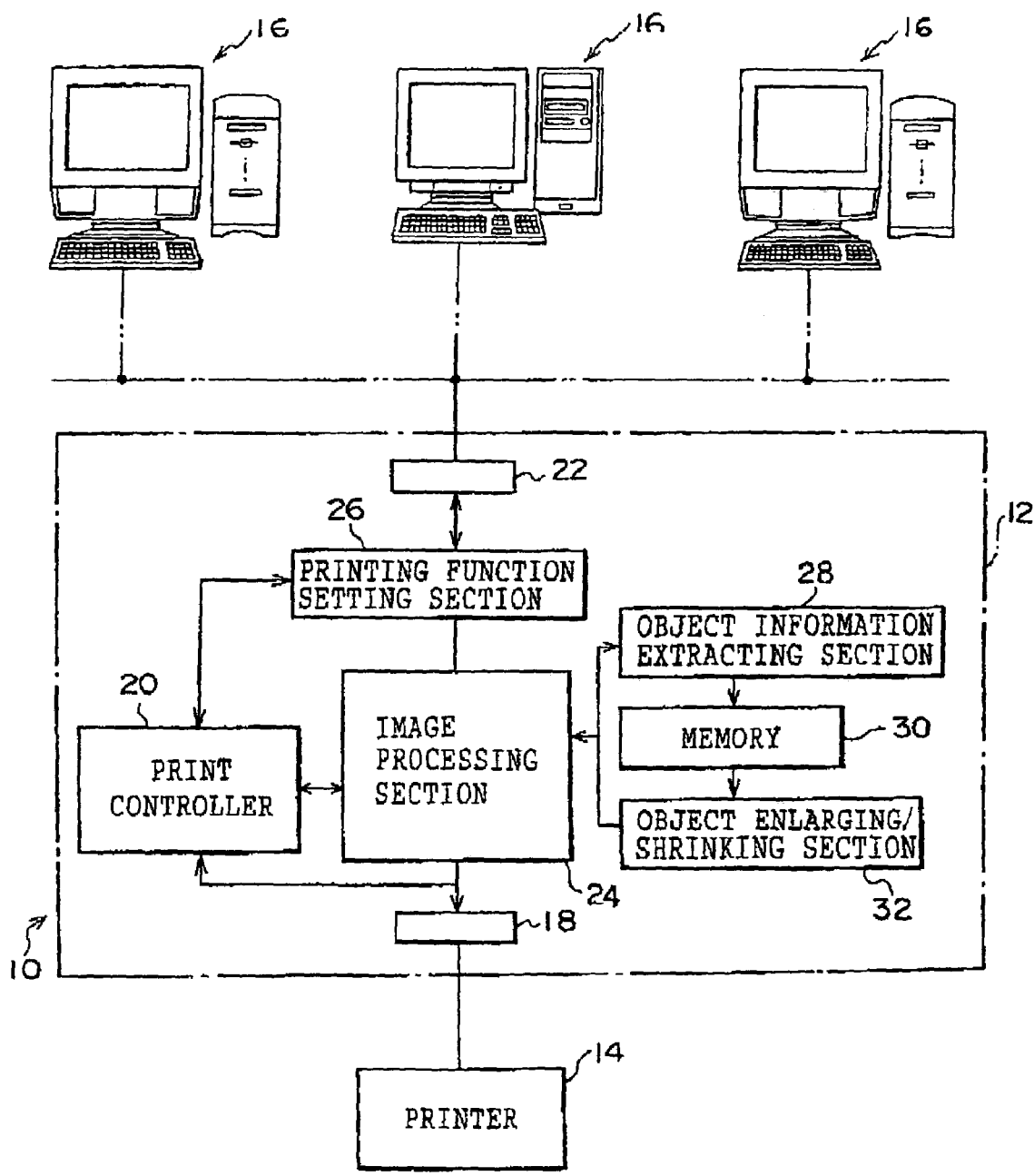
FIG. 1 is a schematic structural diagram showing a relevant section of a print server, which is applied as an image processing device of the invention.

Embodiments of the present invention will be explained hereafter with reference to the drawings. FIG. 1 shows a schematic structure of a printing system (image processing system) 10 according to the invention. The printing system 10 has an image processing device 12, which is composed of, for example, a standard personal computer (PC) with a PCI board having predetermined functions added thereto. Moreover, the image processing device 12 is connected to a printer 14 as a print output device, and the printer 14 prints out an image processed by the image processing device 12.

Further, the image processing device 12 is connected to client terminals 16, such as personal computers or workstations, which serve as image processing terminals. Each of the client terminals 16 can use DTP functions, which execute image processes such as creating, processing and editing an image, with the use of various applications. The image processing device 12 processes image data process based on drawing commands input from the client terminals 16.

In the printing system 10, the image processing device 12 also functions as a print server (hereinafter, the image processing device 12 is referred to as "the print server 12"). In the printing system 10, the print server 12 may be connected to a plurality of printers 14, and the print server 12 may be connected to the plurality of client terminals 16 via a network such as LAN or WAN.

The print server 12 to be used in this embodiment is provided with memories such as a ROM, a RAM and a hard disk. It is operated by an operating program stored in the ROM and executes processing on an object, an image, a character, a table and the like based on a program stored in the ROM or memory.

Such a print server 12 is provided with input devices such as a keyboard, a mouse (not shown), and a display device such as a CRT display. Moreover, also in the print server 12, print processing can be executed on an image displayed on the display device (WYSIWYG function).

The print server 12 is provided with a bi-directional interface 18 such as an Ethernet (R) and a print controller 20. The print controller 20 is connected with the printer 14 via the bi-directional interface 18. Moreover, the print server 12 is provided with an image processing section 24.

The image processing section 24 creates raster data based on the drawing command and the image data. The raster data are controlled by the print controller 20 so as to be output to the printer 14, thereby obtaining a printed material based on the drawing command and the image data.

Meanwhile, the print server 12 is provided with a network interface 22, which serves as an input section. Image information including the image data and the drawing command is input from the client terminal 16 via a network interface 22. The print server 12 performs the printing process on the image data based on the drawing command in the image information. The drawing command includes information about the object. The object information includes information about a position and a shape of the object and trapping information. The trapping information includes information about a trap width.

The client terminal 16 executes image processing such as creating, processing and editing of the image using various DTP applications, such as Photoshop, Illustrator (product names of Adobe Systems Incorporated) and QuarkXPress (product name of Quark Incorporated). The client terminal 16 creates image data such as a page layout and the like (hereinafter, explanations will refer to "page layout").

The page layout created by the client terminal 16 is used for creating a film to be used for exposure of a printing plate in a CEPS or exposing a printing plate using direct plate making (CTP). The printing process is executed using a press plate, which is created based on the page layout.

In DTP, prior to creating the press plate based on the page layout, a printed proof material (hereinafter "proof"), referred to as a color proof or the like, is printed out in order to proof the page layout. In the printing system 10, which is applied to this embodiment, this proof is created.

When this proof is performed, image information including the drawing command and the page layout is output from the client terminal 16 to the print servers 12. As a result the print server 12 executes the printing process based on the page layout.

The page layout input from the client terminal 16 may be YMCK or RBG formatted, or a combination of both.

The image processing section 24 provided in the print server 12 executes a color separation process for separating each colors C, M, Y and E for each page layout based on the image information input from the client terminal 16. Further, the image processing section 24 executes an RIP process for creating raster data based on the image data for each color, which are subject to the color separation process, so as to output the data to the printer 14. As a result, color printing is performed with the printer 14.

The print server 12 is provided with a printing function setting section 26. The printing function setting section 26 reads the setting of the printing function on the drawing command of the image information, and sets the printing function accordingly at the time of executing the image process and the printing process. The setting of the printing function is not limited to this method only. For example, the printing function may also be set by extracting a name of the application that the print server 12 uses to create the image information, and using a set value previously set and stored based on the extracted result.

Figure 2:
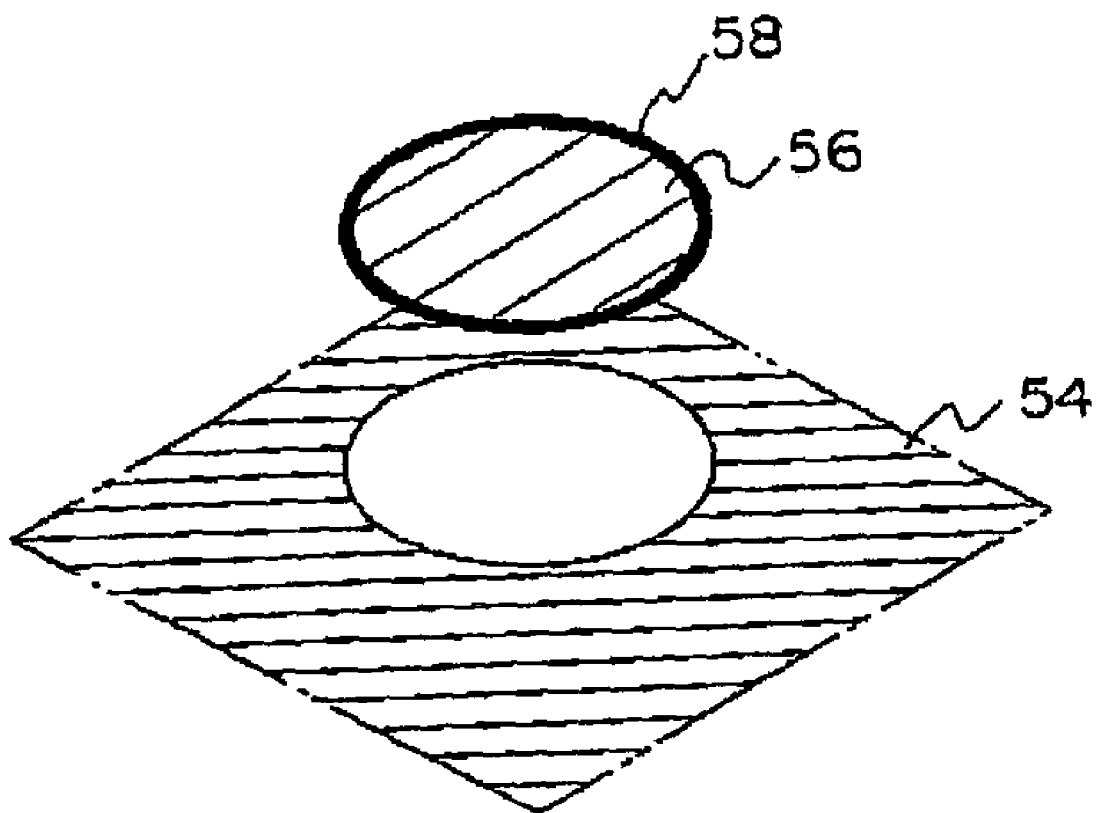
FIG. 2 is a schematic diagram showing one example of overprinting.

Meanwhile, as shown in FIG. 2, on the page layout, for example, a background image 54 is knocked out and a foreground image 56 is fitted into the knocked out portion. At this time, in order to fill a gap between images 54 and 56, a trapping process such as a spreading an outline of the image 56 or choking for narrowing a knocked-out area of the background image is executed. Here, in certain applications such as QuarkXPress, even if the trapping process is set, a trapped portion is not actually drawn in the composite output.

In the print server 12 shown in FIG. 1, the printing function setting section 26 detects as to whether the trapping process is specified, and when the trapping process is specified, the trapping process is executed based on this specification.

Meanwhile, the print server 12 is provided with an object information extracting section 28, a memory 30 and an object enlarging/shrinking section 32. The object information extracting section 28, the memory 30 and the object enlarging/shrinking section 32 may be formed in the image processing section 24.

The object information extracting section 28 extracts information about the object (object information) such as an image, character and object arranged on the page layout, and saves the extracted object information in the memory 30. Moreover, when the trap width is set and trapping is specified for the object, the object information extracting section 28 also saves the trap width as the object information in the memory 30.

As the memory 30, a semiconductor memory such as RAM may be used or a hard disc or the like may be used.

When the trapping process is specified for the object, the object enlarging/shrinking section 32 reads the trap width and enlarges or shrinks the object based on the trap width.

As the function of this embodiment, an outline of the trapping process in the print server 12 (image processing section 24) will be explained.

In the client terminal 16, the object, such as an image, a character or shape, is arranged so that a page layout for DTP is created with various applications. In the printing system 10, the page layout created in the client terminal 16 is input as the image information into the print server 12. The print server 12 gives a predetermined process to the input page layout according to a drawing command so as to output it to the printer 14. The printer 14 prints out an image corresponding to the page layout.

In the print server 12, when the image information is input, a path is structured for each page layout based on the drawing commands. At this time, object information is extracted for each object on the page layout, and the extracted object information is saved in the memory 30.

In addition, the print sever 12 executes the RIP process, namely, a process for creating raster data for each page layout. At this time, in the print server 12, when the trapping is specified for the object on the page layout, the corresponding object information about the object is read from the memory 30, and the object is enlarged or shrunk based on the object information. At this time, when the trap width is specified, the object is enlarged or shrunk based on the trap width.

Figure 3A:
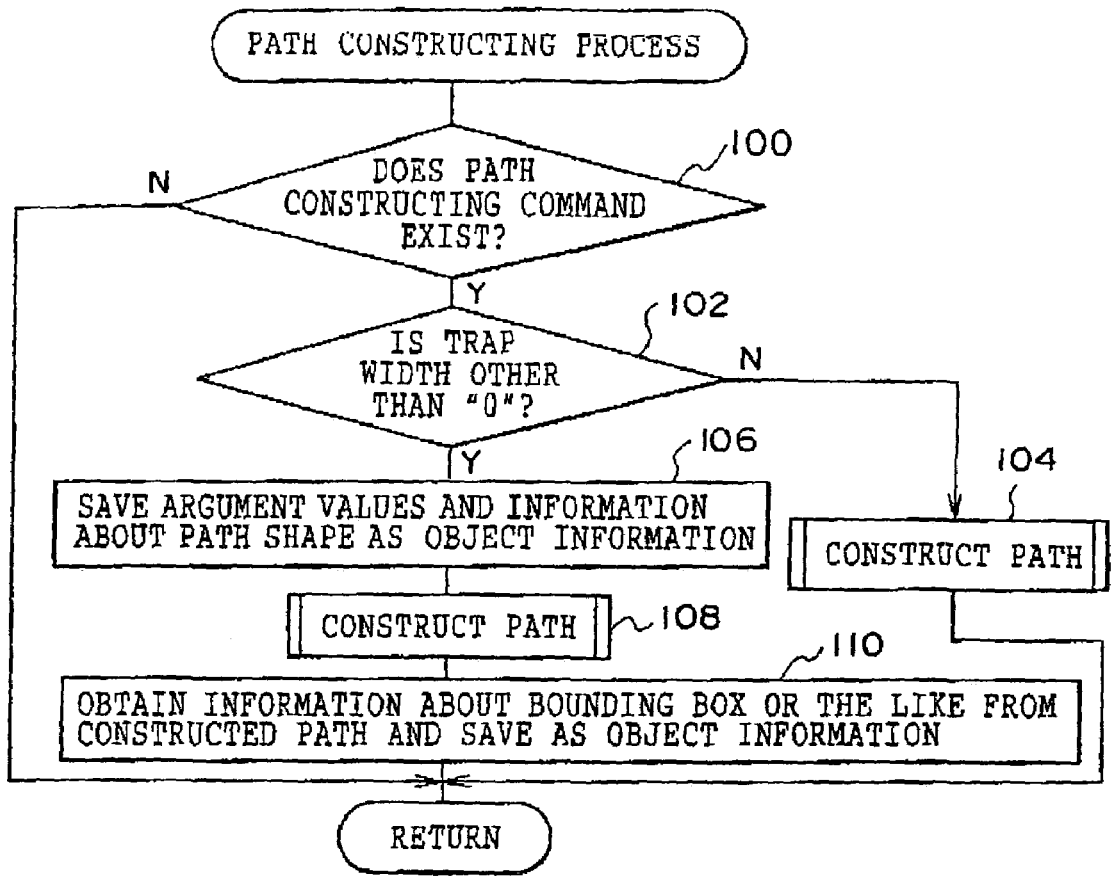
FIG. 3A is a flowchart showing an outline of the saving of object information for an object to be trapped.

FIG. 3A shows an outline of path construction. In this flowchart, upon detection of the drawing command of the path construction at the first step 100, the process goes to step 102, where confirmation as to whether the trap width is "0" is performed. This process is performed for each of the path constructing commands on the page layout.

When the trap width is "0", a negative determination is made at step 102 and the process goes to step 104 so that the path construction is executed based on the drawing command.

Meanwhile, when the trap width is set and is not "0", an affirmative determination is made at step 102 and the process goes to step 106, and an argument value showing the trap width and a path shape are read so as to be saved as the object information in the memory 30.

At next step 108 the path construction is executed based on the drawing command, and at step 110 information about a bounding box or the like is obtained from the constructed path so as to be saved in the memory 30.

When the object is created and output by the application, a drawing code of a certain format is used, and a shape of the object or the like arranged on the page layout can be estimated from the drawing code For example, when a square is drawn to be output by QuarkxPress, which is one example of a layout software, a drawing code such as "207 142.07 425.54 360.61 F rc" is created.

Here, a procedure "rc" shows that the square is drawn from an argument of four numerical values and one truth-value, the first four numerical values show a coordinate of the lower right corner of the square (in this example, (142.07, 207)) and a coordinate of the upper left corner (in this example, (360.61, 425.54)), and the truth-value becomes F (False) at the time of formation of the square At this time, the procedure "rc" is redefined so that a process for saving information necessary from trapping, constructing the path and saving information for determining the path is executed.

The information necessary for trapping includes information about an argument value and a path shape (in this case, a square) and at the step 106, this information is saved as the object information.

Meanwhile, the information for determining the path is used to determine whether the saved information is for the path to be drawn for trapping process at the time of actual drawing. This information enables the constructed path to respond to cases such as when the constructed path is not drawn but is clipped or discarded, even if the path is constructed and is drawn.

The information for determining the path can be obtained from the constructed path, and random information can be used as long as the paths can be discriminated uniquely by this information. For example, information about a lower left coordinate and an upper right coordinate on a frame of a square, which is referred to as a bounding box, can be used from the constructed path. Moreover, information about a command to be used at the time of constructing the path or coordinate information about a starting point of the path may be used, and any one of these pieces of information is saved in the memory 30 at the above step 110.

Meanwhile, a decision is made, based on the set trap width, as to whether the object information is saved. When the trap width is set to "0", the determination is made that the trapping is not set, and a negative determination is made at step 102 so that the object information is not saved.

In addition, the procedure for setting the trap width of "settrap" or the like output from the application is redefined so that the trap width by an argument is saved as the object information and the trap width can be referred to when trapping is executed.

The determination can be made that a positive value of the trap width indicated spreading and a negative value of the trap width indicates choking. When trapping is actually executed, either the trap width output from the application or a pre-set and saved trap width may be used.

After the path is constructed and the object information corresponding to the path construction is saved in such a manner, the drawing process is executed.

Figure 3B:
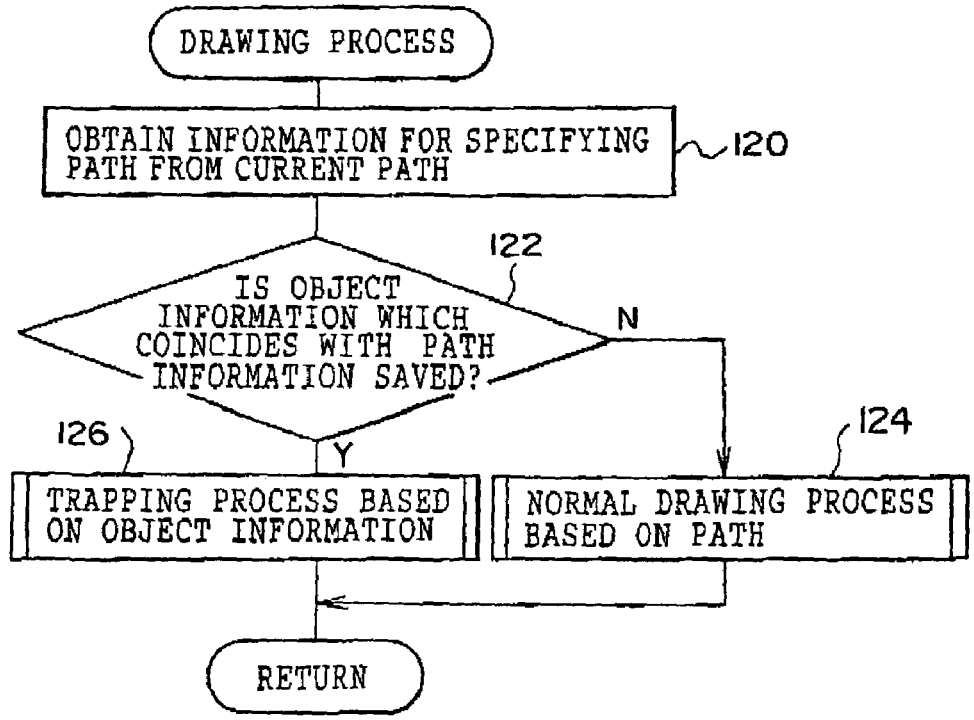
FIG. 3B is a flowchart showing an outline of a process using the saved object information.

FIG. 3B shows an outline of the flow of the drawing process, and this flowchart is executed when the drawing process is executed based on the drawing command (commands such as fill and eofill in PostScript language) which are based on the constructed path. At first step 120, information which can specify a path of a bounding box or the like is obtained from the path to be drawn, and at step 122 a confirmation is made as to whether object information, which coincides with the path information, is saved.

When there is no coincided information, a negative determination is made at step 122 and the process goes to step 124 so that normal drawing is executed.

However, when the coincided object information is saved, an affirmative determination is made at step 122 and the process goes to step 126 so that the object information including a saved drawing command is read and trapping is performed.

For example, in the case where choking is executed on a background when drawing a square, coordinates on its lower left are moved to a plus direction by the trap width, and coordinates on its upper right are moved to a minus direction by the trap width so that knocking out is executed, and the square is drawn on its original coordinate in the overprint setting.

In addition, when the spread process is executed on a foreground square object, the background is knocked out in the square shape with its original size, and the square object is drawn by the overprint setting with the coordinates on its lower left moved to the minus direction by the trap width and the coordinates on its upper right moved to the plus direction by the trap width.

The information necessary for the path construction is saved as the object information so that the trapping setting is reproduced and an object can be drawn based on the path.

The invention will be further explained below by referring to specific examples.

SPECIFIC EXAMPLE 1

When a square is drawn by PostScript language, the following drawing codes are used. Portions after "%" in each line are comments.

newpath % clearing of path
00 moveto % move to (0,0)
10 lineto % create a linear path from (0,0) to (1,0)
11 lineto % create a linear path from (1,0) to (1,1)
01 lineto % create a linear path from (1,1) to (0,1)
00 01 setcmykcolor % specify a drawing color (black)
fill % fill the constructed path In these drawing commands, it is commanded that a square having a lower left corner at (0,0) and one side with a length of 1 be drawn with black. As the information about obtainable paths at the time of drawing, information, which is equivalent to the drawing command for constructing the path, can be obtained. Namely, the information, which is equivalent to following information, can be obtained:

newpath
00 moveto
10 lineto
11 lineto
01 lineto

In the case of such a simple object, combinations of the on-executing drawing commands are checked, so that the shape of the constructed path can be discerned. Namely, discernment is made that (moveto, lineto, lineto) is a triangle and (moveto, lineto, lineto) is a square.

Meanwhile, when the shape is distinguished as a square, respective coordinate values are compared so that each coordinate of portions corresponding to apexes is obtained. At this time two points having smaller x-coordinate values become left apexes, and one of these two points having the smaller y-coordinate value becomes a lower left apex and larger one becomes an upper left apex. The similar positional relationship can be applied to two apexes on the right side.

In the case where spreading is selected, after these pieces of information are saved as the object information, the constructed path of the background is knocked out with white and drawn. Thereafter, the square, of which only the trap width is enlarged, is drawn with a specified color (in this case, black by overprinting.

At this time, when the trap width is 0.2, the lower left x-coordinate and y-coordinate, the upper left x-coordinate and the lower right y-coordinate are shifted by −0.2, and the upper left y-coordinate, the lower right x-coordinate, the upper right x-coordinate and y-coordinate are shifted by +0.2.

As a result, the path of the square can be constructed so as to overlap with the background by only 0.2, which is the trap width. Namely, the following drawing codes are usable:

newpath
−0.02 −0.02 moveto
1.2 −0.2 lineto
1.2 1.2 lineto
−0.2 1.2 lineto are executed so that the path is constructed. Thereafter, a "fill" command is executed so that the path may be actually drawn.

In addition, in the case of choking, the lower left x-coordinate and y-coordinate, the upper left x-coordinate and the lower right y-coordinate are shifted by +0.2, and the upper left y-coordinate, the lower right x-coordinate and the upper right x-coordinate and y-coordinate are shifted by −0.2.

The coordinates obtained by such calculations are used so that the small square path is constructed, and after this path is drawn by white knockout, the path with the original size is constructed so as to be drawn with a color specified in overprinting.

When such a method is used, if an object has a simple shape such as a rectangle, the trapping can be reproduced comparatively easily, As for objects such as a slightly tilted square, or a complicated polygon and circle, the process for discriminating the objects and the coordinate operation for the trapping process becomes complicated.

SPECIFIC EXAMPLE 2

In spreading, the trapping can be reproduced by drawing lines with overprint by using the constructed path.

In this case, before the constructed path is filled, "stroke", which is the drawing command for drawing the path with a line, is used so that the line is drawn by the overprint. Since the line is drawn with a width centered on the path, the width at the time of drawing becomes two times as wide as the trap width for spreading.

Thereafter, the same path is filled by knock-out, so that an inside portion of a center of the path is wholly knocked out by filling and only an outside of the center of the path is overprinted, thereby reproducing the trapping.

As a result, the spread process can cope with any shape of a path and can reproduce comparatively easily.

SPECIFIC EXAMPLE 3

Normally, discerning what an object is during the path construction is impossible, but with the drawing codes output from the application, a basic object is mostly drawn by defining a special procedure at the time path creation of an object. Moreover, a rotating object is realized in such a manner that the basic shape is drawn and a rotating command is executed on this object. The shape of the path to be constructed can be easily discerned by utilizing this characteristic, so that trapping can be easily realized.

In specific example 3, an example according to the flowchart of FIGS. 3A and 3B will be explained.

As explained above, when there is a drawing code "207 142.07 425.54 360.61 F rc", the procedure "rc" draws one square from an argument of four numerical values and one truth-value.

In the composite output of conventional art, where the trapping is set, the square is drawn by knocking out a normal background.

In contrast, redefining the procedure "rc" as in the present invention, when the trapping is set, the four values (207, 142.07, 425.54, 360.61) and the truth-value "F" are used at the time of constructing path so that a procedure "rc proc" for constructing the path of the square by means of the same process as "rc" is saved.

Further, as information for discriminating the path, bounding box information obtained from the constructed path and information specifying a shape of the path are saved. At this time, the bounding box information becomes two pieces of information (142.07, 207) and (360.61, 425.54).

The information specifying the shape of the path includes a drawing command to be executed in order to construct the path. The information at this time is (moveto, lineto, lineto, lineto). Moreover, as the information specifying the shape of the path, parameters at the time of executing the drawing commands, such as coordinate information, may be saved if they can be obtained. Moreover, the information is not limited to those described above, and any information may be used as long as it can be obtained from the constructed path.

Meanwhile, when the actual drawing (drawing command) is executed, a determination is first made from the information for discriminating path as to whether a path to be drawn is identical to a path of saved object information for trapping.

At this time, information, which shows a bounding box and a shape of the path obtained from the path to be drawn, is compared with the saved information, which illustrates the bounding box and the shape, so that confirmation is made as to whether they are identical.

When they are identical, trapping is reproduced by using the saved object information. When they are not identical, normal drawing without trapping is executed.

Figure 4A:
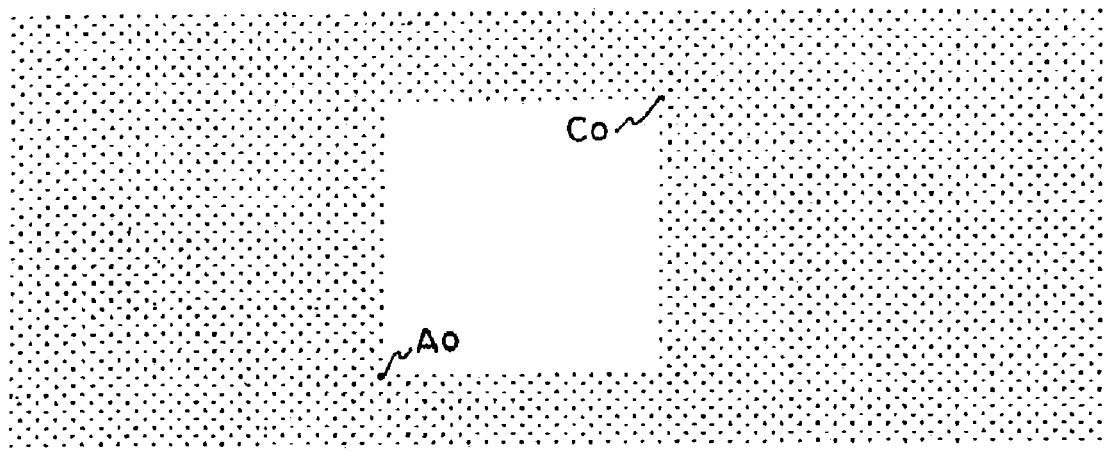
FIG. 4A is a schematic diagram showing a state where a background is knocked out with a spread process.

When firstly the spread process is executed, as shown in FIG. 4A the constructed path is drawn by white knock-out. At this time, a coordinate of point $A_0$ on the lower left of FIG. 4A to be knocked out is (142.07, 207), and a coordinate of point $C_0$ on the upper right of FIG. 4A is (360.61, 425.54).

Next, the square, which is enlarged by the trap width, is drawn by overprinting. Namely, saved four numerical values (207, 142.07, 425.54, 360.61) are converted into (206.8, 141.87, 425.74, 360.81) and the path is reconstructed by using the saved "rc proc" so that the constructed path is drawn by overprinting.

Figure 4B:
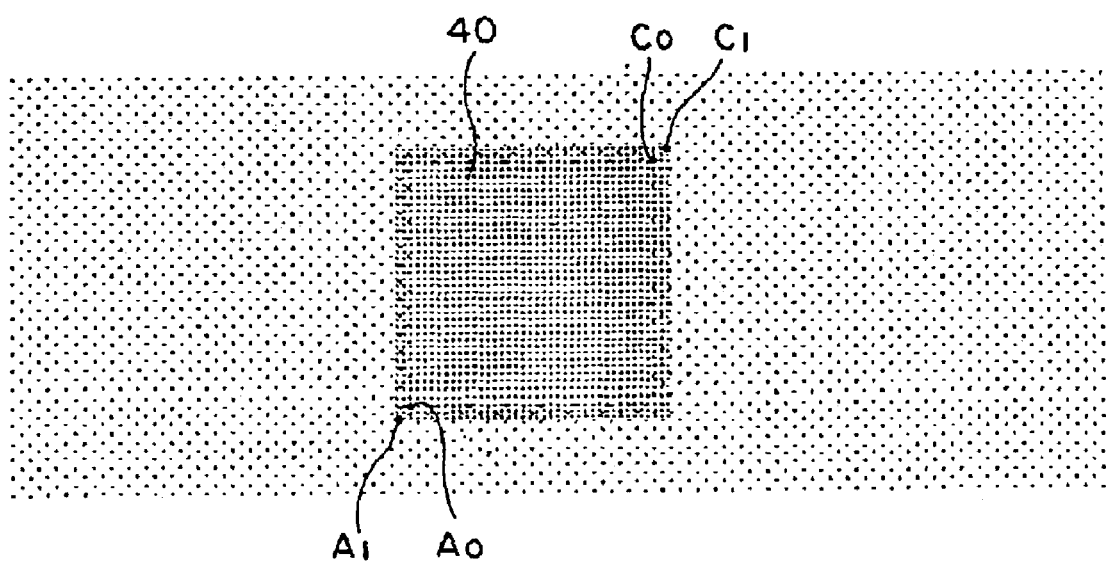
FIG. 4B is a schematic diagram in which drawing is executed on the knocked-out background with the spread process.

As a result, as shown in FIG. 4B, as for a object 40 drawn by the overprint, a coordinate of point $A_1$ on the lower left is (141.87, 206.8) and a coordinate of point $C_1$ on the upper right is (360.81, 425.74).

The reproduction of overprint can be carried out by using a technique such as In-RIP Separation or by specifying Device N color space in PostScript, thereby reproducing the trapping in the spread process.

Meanwhile, when the choke process is executed, the constructed path is discarded once, and the square of which only the trap width is reduced is knocked out.

Figure 5A:
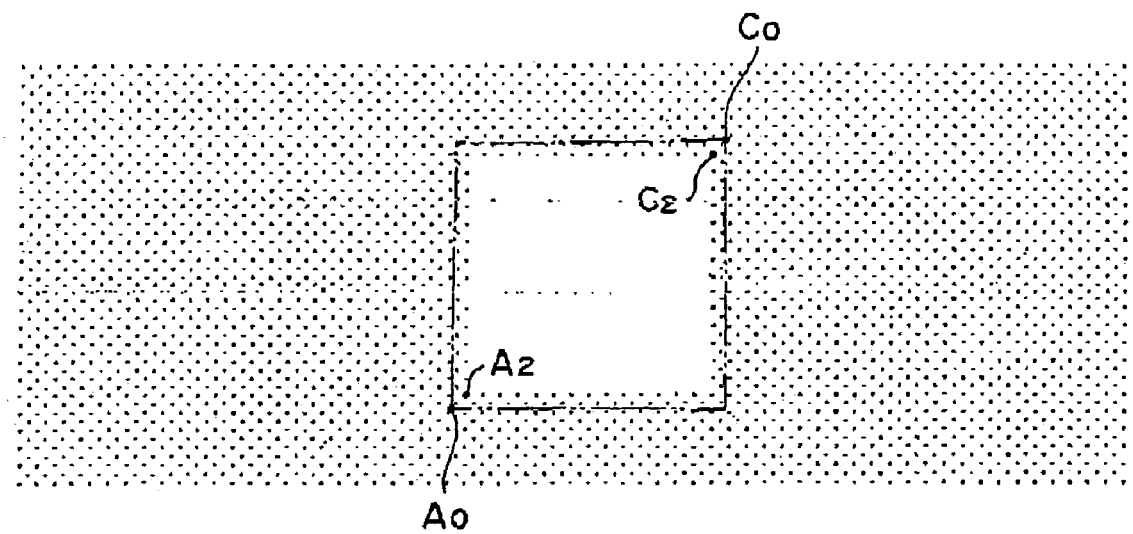
FIG. 5A is a schematic diagram showing a state where a background is knocked out with a choke process.

Namely, the saved four numerical values (207, 142.07, 425.54, 360.61) are converted into (207.2, 142.27 425.34 360.41), and the path is constructed by the saved "rc proc" so as to be knocked out with white as shown in FIG. 5A.

At this time, a coordinate of point $A_2$ on the lower left (lower left on the sheet of FIG. 5A) to be knocked out is (142.27, 207.2) and a coordinate of point $C_2$ on the upper right (upper right on the sheet of FIG. 5A) is (360.41, 425.34).

Next, the square with the original size is drawn by overprint. At this time, the path is constructed by the saved four numerical values (207, 142.07, 425.54, 360.61) and "rc proc" so as to be drawn by overprinting.

Figure 5B:
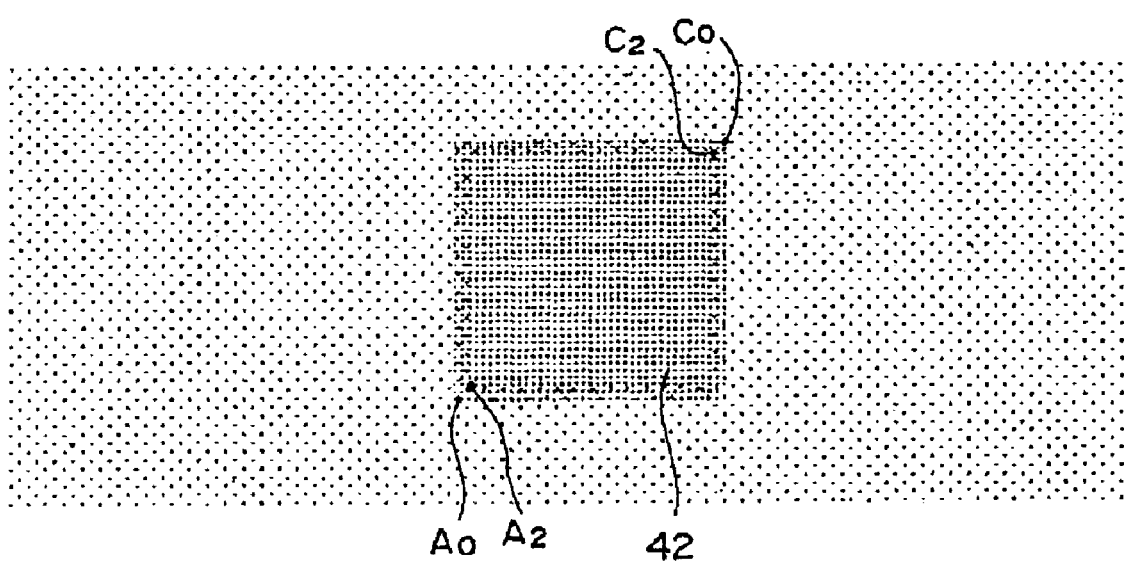
FIG. 5B is a schematic diagram in which drawing is executed on the knocked-out background with the choke process.

As a result, as shown in FIG. 5B, as for a object 42 drawn by overprint, a coordinate of point $A_0$ on a lower left is (142.07, 207), and a coordinate of point $C_0$ on an upper right is (360.61, 425.54) so that the object 42 is reproduced by the choke process.

When the trapping process is executed in such a manner, wherein the path is constructed by a procedure such as "rc", it is discarded without being drawn, and when another path is created and drawn, it is preferable that a determination be made as to whether the path to be drawn is a proper path using the information obtained from the constructed path so that the trapping is not reproduced by misusing the information (object information) saved at the time of constructing the path by means of "rc".

In addition, if the object information saved at the time of constructing the path can be cleared (deleted) securely when discarding the path, such discernment is not necessary. However, it is important to note that redefining many drawing commands becomes necessary in order to cope with all the cases where a path is discarded.

The above-explained embodiment does not limit the structure of the invention. For example, the shape of an object or the like, in which the reproduction of overprint by choking is difficult, occasionally appears. However, in such cases, a reproduction method in which a choke portion is substituted by a spread may be used, or the choke portion may be ignored, or these methods may be switched with a user interface.

Further, the present embodiment explained the print server 12 provided to the printing system 10 as an example, but the invention is not limited to this alone. The invention can be applied to an image processing device having an optional structure for executing a printing output process that corresponds to drawing commands, or image data composite-output from an image processing terminal such as the client terminal 16.

According to the invention, an excellent effect is obtained such that an object in which trapping is specified can be easily reproduced by trapping in the composite output from the image processing terminal.

What is claimed is:

1. An image processing method of executing image processing corresponding to a drawing command or image data based on a page layout created by an image processing terminal so as to enable a printing output corresponding to the page layout, comprising:
    saving information, including a position and a shape of the object and at least one trapping process parameter set in the drawing command or the image data for the object, in a saving means, when setting an object placed on the page layout, the at least one trapping process parameter including a trap width; and
    when drawing the object on the page layout, enlarging or shrinking the object based on the information saved in the saving means by means of an enlarging/shrinking means,
    wherein the enlarging/shrinking means sets an enlarging/shrinking width of the object based on the trap width saved in the saving means.

2. An image processing method according to claim 1, wherein only the information regarding the object for which trapping is specified is saved in the saving means.

3. An image processing device, comprising:
    an input section for inputting image information including image data of an image including an object, information about a position and a shape of the object in the image and trapping process setting information for the object; and
    a processing section for constructing a path forming the object based on the position and shape information of the object in the inputted image information and when drawing the constructed path, executing the trapping process on a shape, which is based on the path, on the basis of the position and shape information of the object and the trapping process setting information in the inputted image information.

4. An image processing device according to claim 3, wherein the trapping process setting information is at least a trap width.

5. An image processing device according to claim 4, wherein the processing section enlarges or shrinks the shape, which is based on the path, on the basis of a positive or negative value of the trap width.

6. An image processing device according to claim 4, wherein the processing section executes a spread process on the shape, which is based on the path, on the basis of the trap width when the trap width has a positive value.

7. An image processing device according to claim 4, wherein the processing section executes a choke process on the shape, which is based on the path, on the basis of the trap width when the trap width has a negative value.

8. An image processing device according to claim 3, further comprising a saving section,
    wherein when the path is constructed by the processing section, said processing section saves at least the position and shape information of the object in the saving section, and when the constructed path is drawn, the processing section executes the trapping process on the shape, which is based on the path, on the basis of the position and shape information of the object saved in the saving section and the trapping process setting information.

9. An image processing device according to claim 3, wherein the input section inputs the image information from an image processing terminal, which creates the image information.

10. An image processing device according to claim 9, wherein the image processing terminal creates the image information using a DTP function, and the image information is described by a page description language.

11. An image processing device according to claim 3, wherein the image information is composite data, which are not separated according to color.

12. An image processing method, comprising the steps of:
    inputting image information including image data of an image including an object, position and shape information of the object in the image and trapping process setting information for the object;

constructing a path forming the object based on the position and shape information of the object in the inputted image information; and when drawing the constructed path, executing the trapping process on the shape, which is based on the path, on the basis of the position and shape information of the object and the trapping process setting information in the inputted image information.

13. An image processing method according to claim 12, wherein the trapping process setting information is at least a trap width.

14. An image processing method according to claim 13, wherein in the trapping process step, the trapping process enlarges or shrinks the shape, which is based on the path, on the basis of a positive or negative value of the trap width.

15. An image processing method according to claim 13, wherein when the trap width has a positive value, a spread process on the shape, which is based on the path, is executed in the trapping process step on the basis of the trap width.

16. An image processing method according to claim 13, wherein the step of the trapping process executes a choke process on the shape, which is based on the path, on the basis of the trap width when the trap width has a negative value.

17. An image processing method according to claim 12, further comprising a saving section, wherein when constructing the path, the step of the trapping process saves at least the position and shape information of the object in the saving section, and when drawing the constructed path, the step of the trapping process executes the trapping process on the shape, which is based on the path, on the basis of the position and shape information of the object saved in the saving section and the trapping process setting information.

18. An image processing method according to claim 12, wherein the image information from an image processing terminal, which creates the image information, is inputted at the input step.

19. An image processing system comprising:

an image processing terminal; and an image processing device, wherein the image processing terminal creates image information, which includes image data of an image including an object, and drawing commands including information about a position and a shape of the object and trapping process setting information for the object, wherein the image processing device comprises;

an input section for inputting the image information from the image processing terminal; and a processing section for constructing a path forming the object based on the position and the shape of the object in the inputted image information and when drawing the constructed path, executing the trapping process on the shape, which is based on the path, on the basis of the position and shape information of the object and the setting information about the trapping process in the inputted image information.

* * * * *